(12) United States Patent
Jackobson

(10) Patent No.: US 12,481,024 B2
(45) Date of Patent: Nov. 25, 2025

(54) RADAR BASED OBJECT CLASSIFICATION

(71) Applicant: AUTOBRAINS TECHNOLOGIES LTD, Tel Aviv-Jaffa (IL)

(72) Inventor: Omer Jackobson, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 442 days.

(21) Appl. No.: 18/155,720

(22) Filed: Jan. 17, 2023

(65) Prior Publication Data

US 2023/0228848 A1 Jul. 20, 2023

Related U.S. Application Data

(60) Provisional application No. 63/300,260, filed on Jan. 17, 2022.

(51) Int. Cl.
*G01S 7/41* (2006.01)
*G01S 13/931* (2020.01)

(52) U.S. Cl.
CPC ............ *G01S 7/417* (2013.01); *G01S 13/931* (2013.01)

(58) Field of Classification Search
CPC .......... G01S 13/931; G01S 7/41; G01S 7/415; G01S 7/417
USPC ........................................................ 342/70
See application file for complete search history.

(56) References Cited

U.S. PATENT DOCUMENTS

| | | | | |
|---|---|---|---|---|
| 5,477,225 A | * | 12/1995 | Young | G01S 13/765 342/40 |
| 6,377,872 B1 | * | 4/2002 | Struckman | E02F 9/205 700/258 |
| 10,552,979 B2 | * | 2/2020 | Zhu | G06V 20/56 |
| 11,151,447 B1 | * | 10/2021 | Chen | G01S 7/4091 |
| 11,295,199 B2 | * | 4/2022 | Dalli | G06N 3/10 |
| 11,372,087 B2 | * | 6/2022 | Gebhardt | G01S 7/417 |
| 11,481,916 B2 | * | 10/2022 | Hu | G01S 13/42 |
| 11,511,772 B2 | * | 11/2022 | Kim | G06N 3/02 |

(Continued)

OTHER PUBLICATIONS

Huihui Dong et al., Local Descriptor Learning for Change Detection in Synthetic Aperture Radar Images via Convolutional Neural Networks—IEEE Access, vol. 7, pp. 15389-15403, 2019, doi: 10.1109/ACCESS.2018.2889326.

(Continued)

*Primary Examiner* — Michael W Justice
(74) *Attorney, Agent, or Firm* — RECHES PATENTS

(57) ABSTRACT

A method for radar based object classification, the method may include obtaining multiple radar samples of an object; the multiple radar samples were acquired at different acquisition times; wherein the multiple radar samples comprise a plurality of first radar sample parameters; calculating second radar sample parameters for the multiple radar samples, by applying one or more non-linear functions on at least some of the plurality of first radar sample parameters of at least some of the multiple radar samples; generating an object signature that comprises temporal information and inter-parameter correlation information; wherein the generating comprises feeding, to each one of a deep neural network (DNN) and a time delay neural network (TDNN), (a) at least some of the plurality of first radar sample parameters, and (b) at least some of the second radar sample parameters; and classifying, by a classifier, the signature to a signature class.

19 Claims, 2 Drawing Sheets

(56) References Cited

U.S. PATENT DOCUMENTS

| | | | | |
|---|---|---|---|---|
| 11,520,345 | B2* | 12/2022 | Onofrio | G05D 1/617 |
| 11,531,088 | B2* | 12/2022 | Popov | G01S 13/865 |
| 11,614,514 | B2* | 3/2023 | Chen | G01S 7/40 |
| | | | | 342/70 |
| 11,675,066 | B2* | 6/2023 | Chen | G01S 13/003 |
| | | | | 342/28 |
| 11,688,181 | B2* | 6/2023 | Park | G01S 13/867 |
| | | | | 382/104 |
| 11,762,094 | B2* | 9/2023 | Laddha | G06T 7/20 |
| | | | | 701/25 |
| 11,827,238 | B2* | 11/2023 | Meyer | G01S 13/931 |
| 11,885,907 | B2* | 1/2024 | Popov | G06T 7/246 |
| 11,899,707 | B2 | 2/2024 | Raichelgauz et al. | |
| 12,087,012 | B2* | 9/2024 | Dikhale | B25J 9/1694 |
| 12,119,853 | B2* | 10/2024 | Wang | H04B 1/10 |
| 2019/0353753 | A1* | 11/2019 | Gebhardt | G01S 13/931 |
| 2020/0225317 | A1* | 7/2020 | Chen | G01S 7/417 |
| 2020/0249684 | A1* | 8/2020 | Onofrio | G08G 1/167 |
| 2021/0035279 | A1* | 2/2021 | Hu | H04N 17/002 |
| 2021/0041548 | A1* | 2/2021 | Chen | G01S 13/003 |
| 2021/0133947 | A1* | 5/2021 | Li | G01S 17/931 |
| 2021/0156960 | A1* | 5/2021 | Popov | G01S 13/5242 |
| 2021/0156963 | A1* | 5/2021 | Popov | G06N 3/045 |
| 2021/0174168 | A1* | 6/2021 | Dalli | G06N 3/045 |
| 2021/0183091 | A1* | 6/2021 | Hu | G06T 7/593 |
| 2021/0278539 | A1* | 9/2021 | Laddha | G01S 17/931 |
| 2021/0406560 | A1* | 12/2021 | Park | G01S 13/862 |
| 2022/0084241 | A1* | 3/2022 | Dikhale | B25J 9/1694 |
| 2022/0348229 | A1* | 11/2022 | Kim | G06N 3/02 |
| 2022/0385318 | A1* | 12/2022 | Wang | H04B 1/10 |
| 2023/0063476 | A1* | 3/2023 | Meyer | G01S 7/417 |
| 2024/0077607 | A1* | 3/2024 | Bialer | G01S 13/931 |
| 2025/0060475 | A1* | 2/2025 | Zhang | G01S 13/885 |
| 2025/0068885 | A1* | 2/2025 | Poupyrev | G06F 16/3329 |
| 2025/0094454 | A1* | 3/2025 | Poupyrev | G06F 16/3344 |

OTHER PUBLICATIONS

Oludare Isaac Abiodun et al., Comprehensive Review of Artificial Neural Network Applications to Pattern Recognition—IEEE Access, vol. 7, pp. 158820-158846, 2019, doi: 10.1109/ACCESS.2019.2945545.

Shiv Vignesh, The perfect fit for a DNN—https://medium.com/analytics-vidhya/the-perfect-fit-for-a-dnn-596954c9ea39.

Vijayaditya Peddinti et al., A time delay neural network architecture for efficient modeling of long temporal contexts—DOI: 10.21437/Interspeech.2015-647.

* cited by examiner

```
┌─────────────────────────────────────────────────────────────────────────┐
│ Obtaining multiple radar samples of an object. The multiple radar       │
│ samples were acquired at different acquisition times. 110               │
└─────────────────────────────────────────────────────────────────────────┘
                                    │
                                    ▼
┌─────────────────────────────────────────────────────────────────────────┐
│ Calculating second radar sample parameters for the multiple radar       │
│ samples, by applying one or more non-linear functions on at least some  │
│ of the plurality of first radar sample parameters of at least some of   │
│ the multiple radar samples. 120                                         │
└─────────────────────────────────────────────────────────────────────────┘
                                    │
                                    ▼
┌─────────────────────────────────────────────────────────────────────────┐
│ Generating an object signature that comprises temporal information and  │
│ inter-parameter correlation information. 130                            │
│  ┌───────────────────────────────────────────────────────────────────┐  │
│  │ Feeding, to a deep neural network (DNN), two types of inputs. The │  │
│  │ type of inputs include at least some of the plurality of first    │  │
│  │ radar sample parameters, and (b) at least some of the second      │  │
│  │ radar sample parameters. 131                                      │  │
│  └───────────────────────────────────────────────────────────────────┘  │
│  ┌───────────────────────────────────────────────────────────────────┐  │
│  │ Feeding, to a time delay neural network (TDNN), the two types of  │  │
│  │ inputs. 132                                                       │  │
│  └───────────────────────────────────────────────────────────────────┘  │
│  ┌───────────────────────────────────────────────────────────────────┐  │
│  │ Processing, by the DNN, the two types of inputs to provide a DNN  │  │
│  │ output. 133                                                       │  │
│  └───────────────────────────────────────────────────────────────────┘  │
│  ┌───────────────────────────────────────────────────────────────────┐  │
│  │ Processing, by the TDNN, the two types of inputs to provide a     │  │
│  │ TDNN output. 134                                                  │  │
│  └───────────────────────────────────────────────────────────────────┘  │
│  ┌───────────────────────────────────────────────────────────────────┐  │
│  │ Generating the object signature based on the inter-parameter      │  │
│  │ correlation information and on the temporal information. 135      │  │
│  └───────────────────────────────────────────────────────────────────┘  │
└─────────────────────────────────────────────────────────────────────────┘
                                    │
                                    ▼
┌─────────────────────────────────────────────────────────────────────────┐
│ Classifying, by a classifier, the signature to a signature class. 140   │
└─────────────────────────────────────────────────────────────────────────┘
                                    │
                                    ▼
┌─────────────────────────────────────────────────────────────────────────┐
│ Responding to the classification. 150                                   │
└─────────────────────────────────────────────────────────────────────────┘
100
```

FIG. 1

RADAR BASED OBJECT CLASSIFICATION

BACKGROUND

Radar is a detection system that uses radio waves to determine the range, angle, or velocity of objects. It can be used to detect aircraft, ships, spacecraft, guided missiles, motor vehicles, weather formations, and terrain.

A radar system consists of a transmitter producing electromagnetic waves in the radio or microwaves domain, a transmitting antenna, a receiving antenna (often the same antenna is used for transmitting and receiving) and a receiver and processor to determine properties of the object(s). Radio waves (pulsed or continuous) from the transmitter reflect off the object and return to the receiver, giving information about the object's location and speed.

Radar was developed secretly for military use by several nations.

The modern uses of radar are highly diverse, including air and terrestrial traffic control, radar astronomy, air-defense systems, antimissile systems, marine radars to locate landmarks and other ships, aircraft anticollision systems, ocean surveillance systems, outer space surveillance and rendezvous systems, meteorological precipitation monitoring, altimetry and flight control systems, guided missile target locating systems, self-driving cars, and ground-penetrating radar for geological observations. High tech radar systems are associated with digital signal processing, machine learning and are capable of extracting useful information from very high noise levels. (www.wikipedia.org).

While radar may provide range, angle or velocity of objects, this information may not suffice for accurately classifying objects—especially when the objects are proximate to each other.

There is a growing need to increase the accuracy of the classification of objects using radar signals.

SUMMARY

There may be provided a method, system and non-transitory computer readable medium for radar based object classification.

BRIEF DESCRIPTION OF THE DRAWINGS

The embodiments of the disclosure will be understood and appreciated more fully from the following detailed description, taken in conjunction with the drawings in which:

FIG. 1 illustrates an example of a method.

DESCRIPTION OF EXAMPLE EMBODIMENTS

Figure 2:
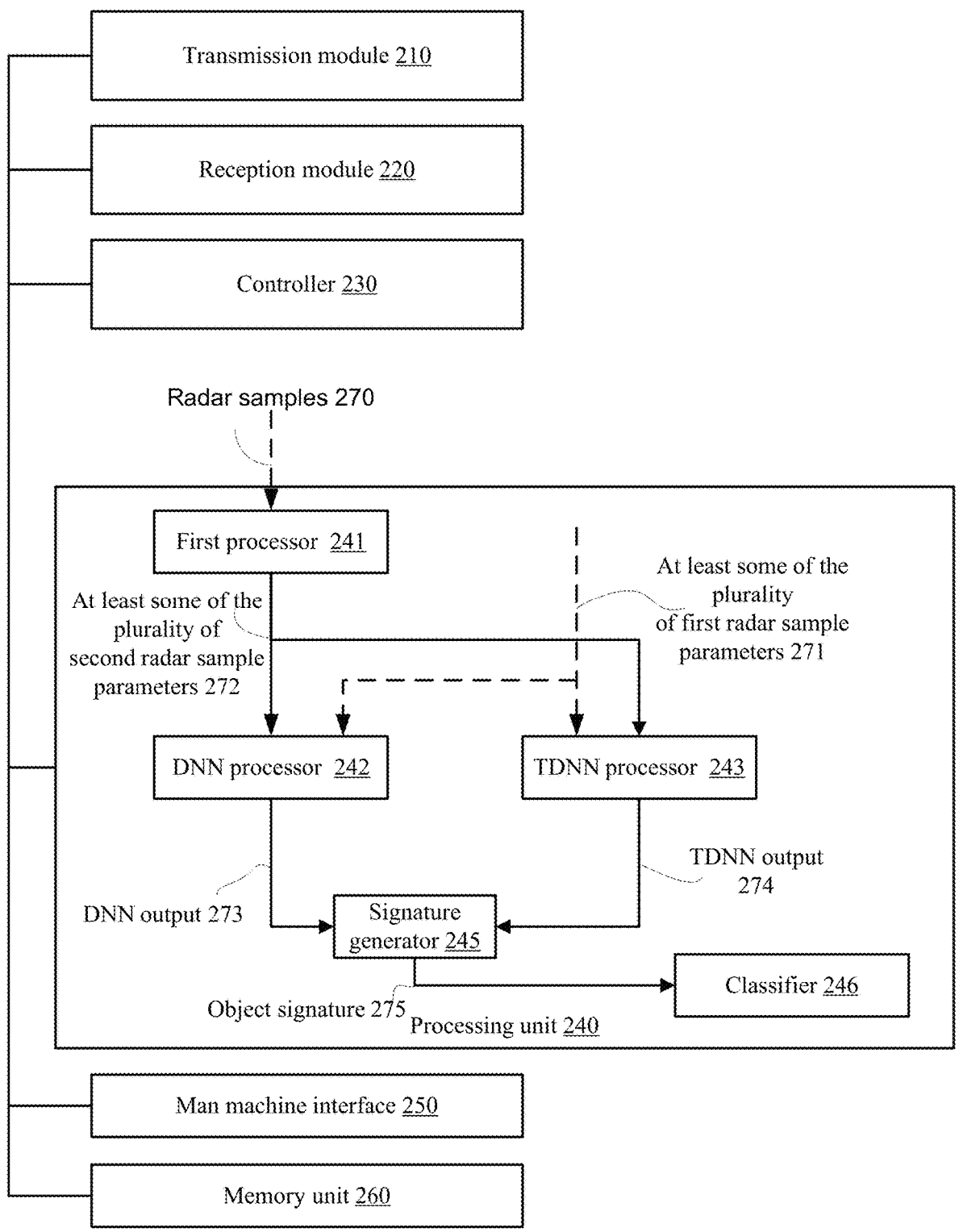
FIG. 2 illustrates an example of a system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a system, method and non-transitory computer readable medium that adjusts the autonomous driving pattern to a desired comfort level of one or more persons within a vehicle. The adjustment can be done in an automatic manner (without human intervention) and especially in an unsupervised manner—thus providing a highly efficient and accurate manner to tailor the autonomous driving patterns.

There may be provided a system, method and non-transitory computer readable medium for classifying objects based on radar signals.

It has been found that deep neural networks, when trained with relatively small labeled dataset, tend to overfitting which leads to lack of generalization which may dramatically reduce the accuracy of object classification.

A trained deep neural network (DNN) may be over-tuned to the labeled dataset—therefore captures spurious rather than true correlations between the radar information and a correct object class.

There may be provided a solution that benefits from the strengths of DNN and TDNN (temporal deep neural network).

The DNN is used for capturing very strong correlations of a general form. E.g., a complex combination of angular velocity at the current frame with radial velocity five frames ago might give strong indication about the object type.

The TDNN is used to capture weaker correlations between the object type and temporally invariant features. For example—since the first two layers of TDNN may be 1-dimensional convolutions, the TDNN begins by transforming data into time-window-based features.

The outputs from the DNN and the TDNN can be combined (for example be concatenated, undergo a lossless compression or any other conversion) to provide an object signature. The outputs can be taken from the penultimate layer of the DNN and of the TDNN to provide a signature that is may be fed into an object-type classifier.

The object-type classifier is trained using such signatures.

FIG. 1 illustrates an example of a method 100.

Method 100 may start by step 110 of obtaining multiple radar samples of an object. The multiple radar samples were acquired at different acquisition times—for example at different (for example consecutive) scans of the radar. The scan can me mechanical, electronic, or a combination of both. For example—a few tens of samples—for example between 20 and 40 samples. Any other number may be provided. The radar may acquire concurrently radar signals of multiple objects—but for simplicity of explanation the method will be illustrated in reference to a single object.

The multiple radar samples may include (or may eb associated with) a plurality of first radar sample parameters. The first radar sample parameters may be, for example, one or more location parameter and/or an intensity parameter and/or an acquisition time parameter, and/or a speed parameter.

The one or more location parameter of a radar sample of the object may be a range of the object and/or an azimuth (angle) and/or elevation of the object. An acquisition time parameter of a radar sample of the object may be the time of acquisition of radar sample of the object. A speed parameter of the radar sample of the object may be the Doppler shift of the radar sample, or the speed of the object.

Step 110 may be followed by step 120 of calculating second radar sample parameters for the multiple radar samples, by applying one or more non-linear functions on at least some of the plurality of first radar sample parameters of at least some of the multiple radar samples.

The applying of the one or more non-linear functions comprising multiplying one of the plurality of first radar sample parameters by another one of the plurality of first radar sample parameters.

It has been found that multiplying one parameter by another and/or other types of non-linear calculations are more accurate when executed without substantially using a neural network.

The second radar parameters may include, for example, a change in the direction of an object, directions of the objects at different point in time, and the like.

The change may be calculated by comparing locations of the object as indicated by different consecutive radar samples and may require translating the location information to three dimensional movements of the object. This may involve performing some trigonometrical calculations that are, at least in part, non-linear.

Any radar sample parameter may not be fed to the DNN and/or the TDNN—for various reasons—for example—an introduction of bias, an increment of false alarms, an increment of false positives, and the like.

The second radar sample parameters may be calculated by pre-processing of raw radar sample parameters such as the first radar sample parameters.

At least one of the first radar sample parameters can be ignored of.

Step 120 may be followed by step 130 of generating an object signature that comprises temporal information and inter-parameter correlation information.

Step 130 may include receiving two types of inputs—(a) at least some of the plurality of first radar sample parameters, and (b) at least some of the second radar sample parameters.

Accordingly the two types of inputs may include one, some or all of the first radar sample parameters and one, some or all of the second radar sample parameters.

As indicated above—there may be cases in which one or more radar sample parameters are not utilized in step 130.

The selection of which one or more sample parameter not to provide may be done in any manner.

For example—selecting a sample radar parameter that is irrelevant to the classification and/or may bias the signature.

For example—if a change of direction of movement of an object is relevant to the classification—but the azimuth is not—then the method may avoid from providing the azimuth to the DNN and the TDNN.

For example—one or more first sample radar parameter may be irrelevant when it already affects a second sample radar parameter.

Step 130 may include:
a. Step 131 of feeding, to a deep neural network (DNN), the two types of inputs.
b. Step 132 of feeding, to a time delay neural network (TDNN), the two type of inputs.
c. Step 133 of processing, by the DNN, the two types of inputs to provide a DNN output. The DNN virtually calculates correlations between different parameters (of the two types of inputs) and the DNN output includes inter-parameter correlation information.
d. Step 134 of processing, by TDNN, the two types of inputs to provide a TDNN output. The TDNN virtually calculates a temporal behavior of the object and the TDNN output includes temporal information.
e. Step 135 of generating the object signature based on the inter-parameter correlation information and on the temporal information. Step 135 may include, for example, having both types of information in the signature. For example—concatenating the inter-parameter correlation information and on the temporal information or linking the inter-parameter correlation information to the temporal information in any manner.

The generating may include combining (for example by concatenating, performing a lossless compression or any other conversion) the outputs of the TDNN and the DNN. The outputs may be taken from the penultimate layer or any other layer of these neural networks. One output may be obtained from one layer and another output can be obtained from another layer.

Step 130 may be followed by step 140 of classifying, by a classifier, the signature to a signature class.

Any classifier may be used. The classifier may compare the signature of the object to a signatures of different know classes of objects to find the matching class.

The inclusion of both temporal information and inter-parameter correlation information may increase the accuracy of the classification—and may differentiate between objects that differ from each other by at least one of behavior, inter-parameter correlation or a combination of both.

Each class may be associated with class metadata such as identity, type of object, behavior patterns, and the like.

The classification may provide an indication about the identity of the object.

For example—the radar can easily differentiate between a bird and a drone based on the temporal information—as the bird may change its direction of movement in a more random manner than a drone.

The classification may be followed by step 150 of responding to the classification.

The responding may include at least one out of:
a. Displaying the class of the object and/or any other information about the object to a user.
b. Generating and/or storing and/or transmitting the classification information and/or any other information about the object.
c. Using the class and/or any other information about the object to augment a display of objects to a user.
d. Sending the classification and/or any other information about the object to another processor.
e. Sending the classification and/or any other information about the object to another sensor.
f. Fusing the classification and/or any other information about the object to information with sensed data from another sensor.
g. Validating the radar sample and/or any parameter related to the object based on the classification and/or any other information about the object. For example—check whether a rate of change in direction of the object co-insides with the class of the object.
h. Controlling at least one of a transmission scheme and a reception scheme of the radar—for example selecting an illumination pattern for illuminating certain objects within the field of view of the radar, amending the scan rate of the radar, entering an idle mode, changing a mode of operation of the radar, or setting any other TX/RX parameter of the radar.
i. Controlling a driving of a vehicle that includes the radar.
j. Performing an autonomous driving operation—including but not limited to autonomously driving the vehicle, performing an autonomous ADAS operation—for example performing an autonomous breaking operation, changing a speed and/or direction of the vehicle, taking control for a limited period of time such as for less than a second for one or few seconds and returning the control to a human driver, and the like.
k. Instructing (or requesting) an autonomous driving module of a vehicle (the autonomous driving module is responsible to execute autonomous driving operations) to perform an autonomous driving operation.
l. Transmitting a request (or an instruction) to the autonomous driving module of a vehicle to perform an autonomous driving operation.
m. Instructing (or requesting) an ADAS module of a vehicle (the ADAS module is responsible to execute ADAS operations) to perform an ADAS operation.
n. Transmitting a request (or an instruction) to the ADAS module of a vehicle to perform an ADAS operation.
o. Providing information about the object.
p. Suggesting a driving path to a human driver.
q. Sending requests or instructions to a semi-autonomous module of a vehicle.

The combination of TDNN and DNN overcomes an overfitting that may be introduced when using a small dataset.

The TDNN and the DNN were compact—thus the suggested solution exhibits a reduced power consumption and a reduced size. For example—the TDNN may include a few fully connected layers and convolution layers, the number of features may be a few tens features, and a few tens of channels. The DNN may include a few layers, the number of neurons per layer may be relatively small (for example—first layer a few thousand neurons, second layer and third layer may include a few hundred layers). Few may be between 1 and 9. The classifier may be a neural network that may include between eighty and two hundred input neurons and may classify the object to a class out of few classes.

FIG. 2 illustrates a system 200.

System may be a radar, may include a radar, may be a processor located outside the radar, and the like.

It is assumed, for simplicity of explanation, that system 200 is a radar that includes a transmission module 210, a reception module 220, a controller 230, a processing unit 240, a man machine interface such as display 250, and memory unit 260.

The transmission module 210 may include a transmitter and one or more transmitting antenna. The reception module 220 may include a receiving antenna (may or may not be the transmitting antenna) and a receiver for receiving reflections from objects to provide radar samples.

The processing unit 240 may be configured to execute any one or more steps of method 100. It may include one or more integrated circuits, may be a part of an integrated circuit (for example a part of a system on chip), and the like.

The processing unit 240 may include a first processor 241 that is not a neural network processor, one or more neural network processors such as DNN processor 242 and TDNN processor 243, signature generator 245 and classifier.

FIG. 2 also illustrates various signals such as radar samples 270, at least some of the plurality of first radar sample parameters 271, at least some of the plurality of second radar sample parameters 272, DNN output 273, TDNN output 274 and object signature 275.

The controller 230 may control the operation of the system 200.

It should be noted that method 100 may be executed by a processing unit that is not a part of the radar.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for radar based object classification, the method comprises:
    obtaining multiple radar samples of an object; the multiple radar samples were acquired at different acquisition times; wherein the multiple radar samples comprise a plurality of first radar sample parameters;
    calculating second radar sample parameters for the multiple radar samples, by applying one or more non-linear functions on at least some of the plurality of first radar sample parameters of at least some of the multiple radar samples;
    generating an object signature that comprises temporal information and inter-parameter correlation information; wherein the generating comprises feeding, to each one of a deep neural network (DNN) and a time delay neural network (TDNN), (a) at least some of the plurality of first radar sample parameters, and (b) at least some of the second radar sample parameters; and
    classifying, by a classifier, the signature to a signature class.

2. The method according to claim 1, wherein the first radar sample parameters comprise one or more location parameter, an intensity parameter, an acquisition time parameter, and a speed parameter.

3. The method according to claim 1, wherein the applying of the one or more non-linear functions comprising multiplying one of the plurality of first radar sample parameters by another one of the plurality of first radar sample parameters.

4. The method according to claim 1 comprising preventing from feeding the DNN and the TDNN by at least one first radar sample parameter not included in the some of the plurality of first radar sample parameters.

5. The method according to claim 1 wherein the generating comprises concatenating outputs of the TDNN and the DNN.

6. The method according to claim 1 wherein the second radar sample parameters comprise a direction of movement and a change of direction of movement.

7. The method according to claim 1 comprising responding to the classifying.

8. The method according to claim 7 wherein the responding comprises validating the radio samples based in the classifying.

9. The method according to claim 7 wherein the responding comprises performing an autonomous driving operation.

10. A non-transitory computer readable medium that stores instructions for:
    obtaining multiple radar samples of an object; the multiple radar samples were acquired at different acquisition times; wherein the multiple radar samples comprise a plurality of first radar sample parameters;
    calculating second radar sample parameters for the multiple radar samples, by applying one or more non-linear functions on at least some of the plurality of first radar sample parameters of at least some of the multiple radar samples;
    generating an object signature that comprises temporal information and inter-parameter correlation information; wherein the generating comprises feeding, to each one of a deep neural network (DNN) and a time delay neural network (TDNN), (a) at least some of the plurality of first radar sample parameters, and (b) at least some of the second radar sample parameters; and
    classifying, by a classifier, the signature to a signature class.

11. The non-transitory computer readable medium according to claim 10, wherein the first radar sample parameters comprise one or more location parameter, an intensity parameter, an acquisition time parameter, and a speed parameter.

12. The non-transitory computer readable medium according to claim 10, wherein the applying of the one or more non-linear functions that stores instructions for multiplying one of the plurality of first radar sample parameters by another one of the plurality of first radar sample parameters.

13. The non-transitory computer readable medium according to claim 10 that stores instructions for preventing from feeding the DNN and the TDNN by at least one first radar sample parameter not included in the some of the plurality of first radar sample parameters.

14. The non-transitory computer readable medium according to claim 10 wherein the generating comprises concatenating outputs of the TDNN and the DNN.

15. The non-transitory computer readable medium according to claim 10 wherein the second radar sample parameters comprise a direction of movement and a change of direction of movement.

16. The non-transitory computer readable medium according to claim 10 that stores instructions for responding to the classifying.

17. The non-transitory computer readable medium according to claim 16 wherein the responding comprises validating the radio samples based in the classifying.

18. The non-transitory computer readable medium according to claim 16 wherein the responding comprises performing an autonomous driving operation.

19. A system that comprises a processor that is configured to:
    obtain multiple radar samples of an object; the multiple radar samples were acquired at different acquisition times; wherein the multiple radar samples comprise a plurality of first radar sample parameters;
    calculate second radar sample parameters for the multiple radar samples, by applying one or more non-linear functions on at least some of the plurality of first radar sample parameters of at least some of the multiple radar samples;
    generate an object signature that comprises temporal information and inter-parameter correlation information; wherein the generating comprises feeding, to each one of a deep neural network (DNN) and a time delay neural network (TDNN), (a) at least some of the plurality of first radar sample parameters, and (b) at least some of the second radar sample parameters; and
    classify the signature to a signature class.

* * * * *